Oct. 6, 1931.  M. GOOD  1,826,423
LIQUID FUEL BURNER
Filed June 3, 1926
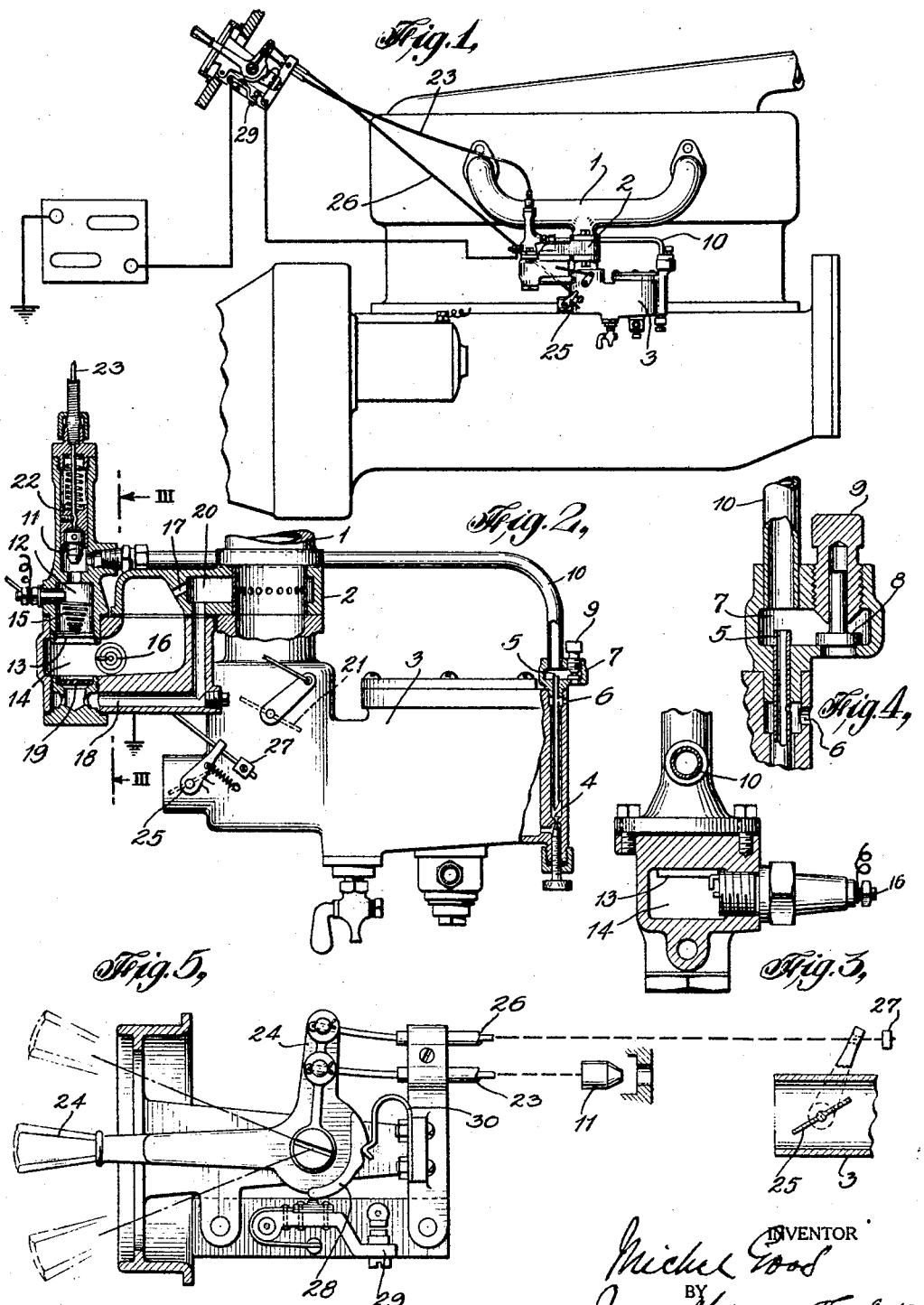

Patented Oct. 6, 1931

1,826,423

UNITED STATES PATENT OFFICE

MICHEL GOOD, OF GARDEN CITY, NEW YORK, ASSIGNOR TO GOOD INVENTIONS CO., OF NEW YORK, N. Y., A CORPORATION OF NEW YORK

LIQUID FUEL BURNER

Application filed June 3, 1926. Serial No. 113,385.

The invention is an improvement in combustion apparatus and methods for producing or improving the charge mixture for internal combustion engines and for other uses. The object is to provide greater certainty of efficient operation than has hitherto been obtained in this class of apparatus, and particularly as applied to the carburetion systems of automobile engines. To this end the invention involves the provision of a combustion chamber, wherein part only of the admitted fuel is permitted to burn, the burned and unburned parts being removed from the chamber separately and the unburned part, or both parts, being conducted to the engine cylinders or elsewhere for conversion into work. The invention also involves various other features related to and independent of the foregoing and as will be hereinafter made apparent and more particularly defined in the claims.

In the accompanying drawings which illustrate a preferred form of the invention—

Fig. 1 is a side elevation of a conventional automobile gasolene engine having the invention applied;

Fig. 2 a larger scale elevation of the suction burner and its appurtenant parts, shown as an attachment;

Fig. 3 a cross-section on line III—III of Fig. 2;

Fig. 4 a detail of the burner air admission valve, and

Fig. 5 an elevation and diagram of a suitable form of operator's control mechanism.

The combustion apparatus is connected to the engine intake 1 by means of an adapter fitting 2 clamped between the terminal flange on the manifold and a mating flange on the main carburetor 3, but it can be built into the manifold or into the carburetor in various ways, as desired. The carburetor 3 may be of any usual or appropriate design. The engine suction transmitted through the adapter causes the delivery of air and fuel into the combustion chamber in substantially explosive proportions. The liquid fuel is drawn from any suitable source, such as the fuel well 4, which has a restricted passage, controlled by a needle valve, connecting it to the constant level fuel receptacle of the main carburetor. The fuel is lifted from this well through the well tube 5, together with some air from the air hole 6, into the valve chamber 7 where it is mixed with more air arriving from the gravity air valve 8 (Fig. 4), sufficient to constitute a completely combustible mixture. The air entering by this valve is subject to control by adjustment of the limit screw 9, which limits the extent to which the valve proper may open; the weight of the valve determines the suction effect which acts on the fuel. The mixture of fuel and air which is produced by this auxiliary carburetor, is drawn through a pipe or other form of passage 10, and passes thence, through the chamber of a shut-off valve, to an entrance or spray chamber 12 and through a grid or screen 13 in the bottom of this chamber into the combustion space, marked 14. The conical wire coil 15 in this chamber is an electric resistance or heater adapted to be energized, in very cold weather, to heat and vaporize the liquid fuel in the incoming mixture so as to insure ignition in the combustion chamber. Ordinarily the use of this coil is not necessary, but its presence is desirable for emergency uses.

The mixture, whether of liquid, or vapor, entering the combustion space 14 is ignited therein by a spark plug 16, or otherwise, filling the chamber with flame.

There are two outlets from the combustion chamber; one of them, marked 17, carries off the flame or combustion products with little or no unburned fuel. The other, marked 18, carries off a substantially dry, hot gaseous medium containing a considerable percentage of unburned fuel and air, and this is an engine-operating mixture in the sense that it is explosive and, in large enough quantity, could operate the engine to the exclusion of other fuel. Flame is excluded from this passage either by the shape of the passage itself, or by a screen or baffle 19 which constitutes the entrance to this outlet. This screen is removable. The location of the screen and fuel outlet, nearer to the mixture entrance than to the outlet 17, enables it to take off more unburned fuel than the latter; in fact it is intended that no unburned fuel shall escape from the outlet 17. Preferably the fuel outlet 18 is placed directly opposite the fuel entrance. The two outlet passages, 17 and 18, join each other in a common passage 20 and pass thence to the manifold through the adapter fitting 2, which latter is provided with a sleeve or pipe section having a ring of holes therein affording entrance to the intake passage in a familiar manner. The admitted medium consisting of combustion products, fuel vapor, or gas, and air, and being quite hot, may if desired be used to the exclusion of mixture from the main carburetor for operating the engine, when idling, but ordinarily and preferably, this medium is used as a supplement to the mixture from the main carburetor mingling therewith, during idling as well as under load, and raising its temperature and correspondingly improving its combustibility and also improving its distribution to the several cylinders. Its addition to the carburetor mixture has the effect of increasing the idling speed of the engine above the rate normally produced by the idling adjustment of the main throttle 21, because it increases the total admission, and is an advantage, inasmuch as it serves as an indication to the operator that the burner is working, that is to say, that the shut off valve 11, above referred to, is open. Ordinarily the burner is required only for the first few miles of driving and its effect is to enable the engine to be put under full load, immediately on starting even in the coldest weather and without increasing the richness of the carburetor mixture. With lower grade fuels its use will, of course, be more prolonged, but with engines in which the exhaust gas heat is transmitted to the intake, its period of use is ordinarily determined by the time required for the engine to "warm up." The principle of admitting hot auxiliary engine operating fuel to the engine, coincidently with the admission of the main carburetor and for the purpose above explained, is not broadly the subject of this invention, the same being the invention of John Good disclosed in application Ser. No. 465,068. In that application the mixture of combustion burner products and unburned, engine-operating fuel passed to the engine through a single outlet, whereas in the present case the burned and unburned parts of the burner mixture pass from the combustion space of the burner through separate passages 17 and 18, as above described. This arrangement has the advantage of greater reliability under the widely varying conditions of actual use in automobile engines, that is to say, it functions to produce instantaneous delivery of an easily explodable mixture to the engine cylinders notwithstanding that the cranking battery may be weak or the engine very cold, or both, or the fuel poor in quality. The suction effect in an engine intake may vary between as little as a few inches of water to some 16 inches of mercury and under all these conditions, the present burner, by reason of the division of its products, provides an equable and proper temperature. The two outlet passages 17 and 18 may be connected independently to the engine intake but for simplicity of structure they are converged into the adapter passage 20, so that they unite at this point and enter the intake as a single mixture. No inflammation results from their junction and contact even though the flame of the burner may extend more or less through the passage 17, but the resulting medium becomes in any case very hot and correspondingly dry, and thereby excellently adapted for transmission through the manifold branches, so that even though the suction effect is very feeble, as when electrically cranking the engine in cold weather, the first explosion is nevertheless quickly obtained.

The shut off valve 11 is a simple poppet valve loosely mounted in a sliding head structure 22 and arranged to be operated by a Bowden wire 23 from a lever 24 mounted on the instrument board or at the operator's station. When this lever is placed in its uppermost position the shut off valve is closed and the burner inactive.

According to this invention, the same lever or instrument which controls the operation of the burner also controls the choke, strangler or primer device 25 of the main carburetor, and for this purpose has a Bowden wire connection 25 therewith. On the ordinary operation of the control lever from its uppermost to its mid position, as indicated in Fig. 5, this choke connection is inoperative, but if the lever be depressed to its lowermost position, the Bowden wire 26 draws its terminal button 27 (adjustable) against the end of the choker arm closing the choker, thereby causing the main carburetor to deliver an excessively rich mixture to the engine.

In this same position of the control lever a cam member 28, fixed thereon, serves to close an electric switch 29, the circuit of which runs from the storage battery to the heating coil 15, as indicated in Fig. 1, and thence to ground through the metal of the apparatus. Thus when the control instrument is fully depressed, the main carburetor is enriched and the vaporizing coil is energized, producing a condition in which the burner is certain to operate and the engine is certain to pick up its cycle. The curvature of the cam piece 28, on the lever hub, coacting with the detent spring 30 tends to return the lever 24 to its mid-position as soon as released by the operator, so that the special condition just referred to obtains only as long as the operator holds the lever depressed. The same spring 30 serves as a friction detent to hold the lever in its uppermost position in which the shut off valve is closed.

The ignition circuit for energizing the spark plug is not indicated in the drawings, but will be understood to be derived from the usual engine spark coil or distributor head in the manner customary for suction burners; it is allowed to operate continuously although its igniting function is completed when the burner is first started. The engine cranking motor is indicated conventionally in Fig. 1 but its circuit is omitted because well known. It will, of course, be understood that this motor is energized coincidently with the manipulation of the operator's control lever to create the initial suction through the burner.

The mechanical design of the burner structure as well as the control instrument are subject to wide variation without sacrificing the advantages or departing from the principles which have been explained above and it is necessarily modified in adapting the structure to different makes of automobiles. No limitation to the specific structure or method herein shown is therefore to be imputed from the appended claims except as specifically pointed out therein.

I claim:

1. Mixture-producing apparatus comprising a combustion chamber provided with means for delivering a spray mixture thereinto and having an outlet for said mixture therefrom opening through a screen, and provided with another outlet for said mixture, the first outlet conducting a large portion of unburned fuel and the second a large portion of combustion products.

2. Mixture-producing apparatus comprising a combustion chamber provided with an entrance chamber for fuel and air opening thereinto through a screen and having an outlet therefrom opening through another screen, and also having another outlet, both leading to a common delivery conduit.

3. In an internal combustion engine, a burner comprising a combustion chamber containing an igniter, means for admitting liquid fuel and air thereto in explosive proportions, an electric vaporizer for such fuel, an igniter therefor, a control instrument at the operator's station and means whereby said instrument controls said vaporizer and the connection of said chamber to the engine intake.

4. In an internal combustion engine, the combination of an engine intake having a carburetor and a suction burner, said burner having separate connections to the intake for combustion products and unburned mixture respectively and a shut-off valve adapted to control the delivery through said connections.

5. In an internal combustion engine, the combination of an engine intake having a carburetor, an auxiliary carburetor, means for separating and burning part of the mixture of the latter carburetor, a passage through which the unburned part of said mixture joins the mixture from the main carburetor and a control instrument at the operator's station for controlling the flow through said passage.

6. In an engine the combination with the carburetor, a suction burner connected to the intake, a valve controlling the flow from the burner to the intake, a richener for the carburetor and a single operating means for said valve and richener.

7. In an engine, the combination with the carburetor, a suction burner connected to the intake, a richener for the carburetor, a vaporizer for the burner and single means for controlling said richener and vaporizer.

8. Mixture-producing apparatus comprising a combustion space having means for continuously admitting liquid fuel and air, in the state of spray, an igniter for said spray, separate outlets from said space connected to said intake, one of them, by its proximity to the point of spray entrance, being adapted to conduct substantially only combustible mixture from said space, and the other being sufficiently remote from such entrance to conduct only combustion products, and means for burning the mixture from said first outlet.

9. Mixture-producing apparatus comprising a combustion chamber having an igniter and admission means for liquid fuel and air in combustible relation, an outlet from said chamber situated in line with and directly opposite said admission means whereby it receives mostly unburned fuel and air, and another outlet situated remote therefrom whereby it conducts mostly the burned products of the combustion in said space.

10. In an internal combustion engine, the combination with the suction intake, of a liquid fuel burner connected thereto and operated by the suction therein to produce a finely divided or spray mixture of liquid fuel and air continuously entering the combustion space of said burner, said space having two outlets, one of said outlets being in the path of said spray mixture and carrying off a major proportion of unburned fuel and the other carrying a major proportion of burned products, both outlets being connected to said intake.

11. In an engine, the combination with the suction-intake, of a suction-operated liquid fuel burner comprising a combustion space having means for producing a spray stream of liquid fuel and air continuously entering said space, separate outlets relatively remote from each other and both connected to said intake, and an electric igniter in said space situated in the path of flow of said stream between the point of fuel entrance and one of said outlets.

12. In an engine, a suction burner comprising a combustion chamber, with means for admitting liquid fuel and air to it, an outlet from said chamber located close to said fuel admission means and adapted to conduct unburned fuel from said chamber to the engine intake, said chamber being extended laterally from the path of such unburned fuel and forming a space for the substantially complete combustion of the fuel therein and an outlet from the extended part of said space also leading to the engine intake.

13. In an engine having a carburetor to supply its normal operating mixture, a suction burner having separate outlets respectively for delivery of a major portion of unburned and burned fuel, both connected to discharge into said normal mixture, and means for coincidently shutting off both deliveries.

14. In an engine, a carburetor to supply the normal operating mixture, a suction burner discharging its products into said mixture, and an operator's control instrument, one position of which shuts off the burner and a second position of which modifies the proportions of the fuel and air in said operating mixture.

15. In an internal combustion engine, an intake, means for furnishing charge mixture thereto comprising two carburetors, one supplying normal operating mixture for the engine, a combustion space supplied with fuel from the other carburetor and having two outlets respectively arranged in different relations to the point of fuel entrance to said space whereby one of said outlets conducts mostly unburned mixture, and a connection between both said outlets and said intake.

16. In an engine, two carburetors, a suction burner supplied by one of them and delivering to the engine intake, and means whereby the operator controls such delivery independently of the other carburetor, said burner comprising a combustion chamber with two outlets constituting the connection to the intake and said outlets being respectively organized to deliver mostly combustion products and mostly unburned fuel vapor to the intake in supplement to said other carburetor.

17. The method of operating internal combustion engines which consists in supplying the same with a normal mixture of liquid fuel and air from a suitable carburetor, supplying an auxiliary mixture to a suitable chamber and igniting it therein, separating unburned mixture from burned mixture in said chamber and adding such separated mixture to said normal mixture supply.

18. The method of operating internal combustion engines which consists in supplying the same with an operating mixture of fuel and air from a suitable carburetor, supplying and burning an auxiliary mixture in a suitable chamber, removing therefrom some of such mixture before its complete combustion, separately removing therefrom the products of combustion therein, combining such unburned mixture and said products and adding them to said operating mixture.

19. Mixture-producing apparatus including a combustion space, means for continuously admitting mixed liquid fuel and air thereto, means for continuously withdrawing the contents of said space from different locations therein, one of said locations being relatively close to said admitting means where the fuel is mostly unburned with the air and the other being relatively remote from said means where combustion is mostly completed, and a conduit leading the mixture from said first location to a place of combustion therefor.

In testimony whereof, I have signed this specification.

MICHEL GOOD.